(12) United States Patent
du Breuil (10) Patent No.: US 7,330,174 B2
(45) Date of Patent: Feb. 12, 2008

(54) METHOD AND APPARATUS FOR A PROGRAMMABLE ELECTROPHORETIC REMOTE CONTROL

(75) Inventor: Thomas L. du Breuil, Ivyland, PA (US)

(73) Assignee: General Instrument Corporation, Horsham, PA (US)

( * ) Notice: Subject to any disclaimer, the term of this patent is extended or adjusted under 35 U.S.C. 154(b) by 596 days.

(21) Appl. No.: 10/401,200

(22) Filed: Mar. 27, 2003

(65) Prior Publication Data

US 2004/0189591 A1 Sep. 30, 2004

(51) Int. Cl.
*G09G 3/34* (2006.01)

(52) U.S. Cl. ..................................... 345/107
(58) Field of Classification Search ............... 345/156, 345/169, 172, 107; 359/295, 296; 455/419; 341/23; 204/450; 725/152; 348/734
See application file for complete search history.

(56) References Cited

U.S. PATENT DOCUMENTS

| | | | |
|---|---|---|---|
| 5,819,294 A | 10/1998 | Chambers | |
| 6,067,185 A | 5/2000 | Albert et al. | |
| 6,120,588 A | 9/2000 | Jacobson | |
| 6,130,726 A * | 10/2000 | Darbee et al. | 348/734 |
| 6,459,418 B1 | 10/2002 | Cominskey et al. | |
| 6,661,564 B2 * | 12/2003 | Tsujimura et al. | 359/296 |
| 6,693,621 B1 * | 2/2004 | Hayakawa et al. | 345/107 |
| 6,721,084 B2 * | 4/2004 | Kawai | 359/296 |
| 6,829,078 B2 * | 12/2004 | Liang et al. | 359/296 |
| 6,977,868 B2 * | 12/2005 | Brewer et al. | 368/46 |

* cited by examiner

*Primary Examiner*—Richard Hjerpe
*Assistant Examiner*—Abbas Abdulselam
(74) *Attorney, Agent, or Firm*—Benjamin D. Driscoll (57) ABSTRACT

A programmable remote control unit including a data processing device, a memory storage unit, a data transmitter, an electrophoretic button, and a bus that communicatively couples the data processing device to the memory storage unit, the data transmitter, and the electrophoretic button; wherein the optical qualities of the electrophoretic button may be modified in response to commands from the data processing device.

21 Claims, 6 Drawing Sheets

*100*

−PRIOR ART−

−PRIOR ART−

METHOD AND APPARATUS FOR A PROGRAMMABLE ELECTROPHORETIC REMOTE CONTROL

BACKGROUND

Recent years have seen an increase in the number of components that may be included in a typical home theatre system. These components may include surround sound receivers, videocassette recorders (VCR), digital videodisk (DVD) players, compact disk (CD) players, set top boxes, televisions, as well as other entertainment components. These home entertainment components are typically controllable through the use of individual remote control units.

A home with a typical home theater system may have any number of different remote control units to control the numerous remotely controlled components. These remote control units not only tend to clutter coffee tables and drawers, they may confuse a user wanting to rapidly select the remote control unit needed to operate a desired component.

Figure 1:
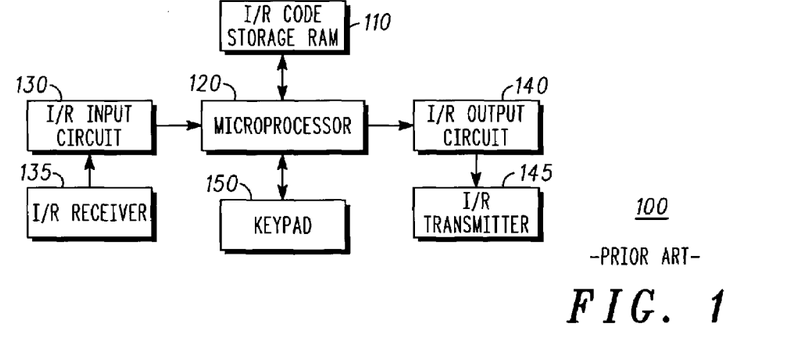
FIG. 1 is a block diagram illustrating a typical programmable remote control unit.

In an effort to reduce the number of remote control units required to control a borne entertainment system, a number of manufacturers have developed programmable "universal" remote control units such as the one illustrated in FIG. 1. As shown in FIG. 1, a typical programmable remote control unit (100) likely includes a microprocessor (120) in communication with both a keypad or button array (150) and an infra-red (I/R) code storage random access memory (RAM) (110). A user may use the keypad (150) to enter component codes into the microprocessor (120) corresponding to the entertainment components the user desires to control. When the component codes have been entered into the programmable universal remote control (100), the microprocessor (120) may then access I/R codes stored in the I/R code storage RAM (110) that are needed to control the desired entertainment components. With the I/R codes identified, the programmable universal remote control (100) may control the desired components by transmitting commands to the components through the I/R output circuit (140) and the I/R transmitter (145). The programmable universal remote control (100) may also receive data from the components through the I/R receiver (135) and the I/R input circuit (130). While the prior art programmable universal remote control unit (100) allows a user to control multiple components with a single remote, the keys on the keypad of the universal remote control are typically pre-labeled and generic, making them difficult to use. In addition, because such remote control units are generic in nature, they tend to be missing device-specific functions relevant to each component that were available on the original remote control unit for that component.

Figure 2:
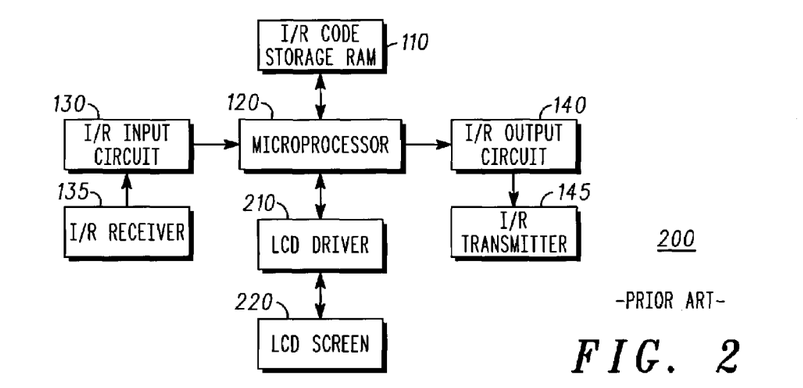
FIG. 2 is a block diagram illustrating a prior art graphical user interface (GUI) touch screen remote.

In order to overcome the generic nature of previous programmable remote control units, liquid crystal display (LCD) touch screen remote control units have been developed as illustrated in FIG. 2. An LCD touch screen remote (200) includes a microprocessor (120) in communication with an I/R code storage RAM (110) similar to the programmable universal remote control. The LCD touch screen remote (200) also includes an I/R receiver (135) and transmitter (145) connected to the microprocessor (120) through an I/R input circuit (130) and an I/R output circuit (140) respectively. The LCD touch screen remote (200) may receive component codes and access I/R codes that have been stored in the I/R code storage RAM (110). Once the desired I/R codes have been located and implemented by the microprocessor, the LCD touch screen displays operation buttons on the LCD touch screen to allow the user to make desired selections. If the user desires, he/she may customize the LCD buttons.

While the features of LCD touch screen remotes allow the buttons to be customized, the implementation of LCD touch screens introduce additional concerns. LCD touch screens tend to be difficult to read in low light. LCD touch screens also lack the tactile feel of actual buttons that may help a user rapidly access a desired button. Moreover, LCD touch screens tend to require more power and subsequently more batteries as compared to typical remote control units.

SUMMARY

In one of many possible embodiments, the present invention provides a programmable remote control unit including a data processing device, a memory storage unit, a data transmitter, an electrophoretic button, and a bus that communicatively couples the data processing device to the memory storage unit the data transmitter, and the electrophoretic button; wherein the optical qualities of the electrophoretic button may be modified in response to commands from the data processing device.

Another embodiment of the present invention provides an electrophoretic button for use with an electronic device including a first electrode layer, a layer of microcapsules communicatively coupled to said first transparent electrode layer, and a second electrode layer communicatively coupled to the addressable layer of microcapsules, wherein the first electrode layer and the second electrode layer selectively apply electric fields to the layer of microcapsules.

In yet another embodiment of the present invention a method for customizing a programmable remote control unit that has electrophoretic buttons is presented including assigning a command function to an electrophoretic button, receiving a user defined label for the electrophoretic button, and forming a representation of the label on the electrophoretic button.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but necessarily identical, elements.

DETAILED DESCRIPTION

The present specification describes to a method for labeling the buttons of a programmable remote control unit. According to one exemplary implementation, described more fully below, a remote control unit is presented that includes programmable electrophoretic buttons that a user may customize with labels corresponding to programmed functions. In the following description, for purposes of explanation, numerous specific details are set forth in order to provide a thorough understanding of the invention. It will be apparent, however, to one skilled in the art that the invention can be practiced without these specific details.

Reference in the specification to "one embodiment" or "an embodiment" means that a particular feature, structure, or characteristic described in connection with the embodiment is included in at least one embodiment of the invention. The appearance of the phrase "in one embodiment" in various places of the specification are not necessarily all referring to the same embodiment.

Exemplary Overall Structure

Figure 3:
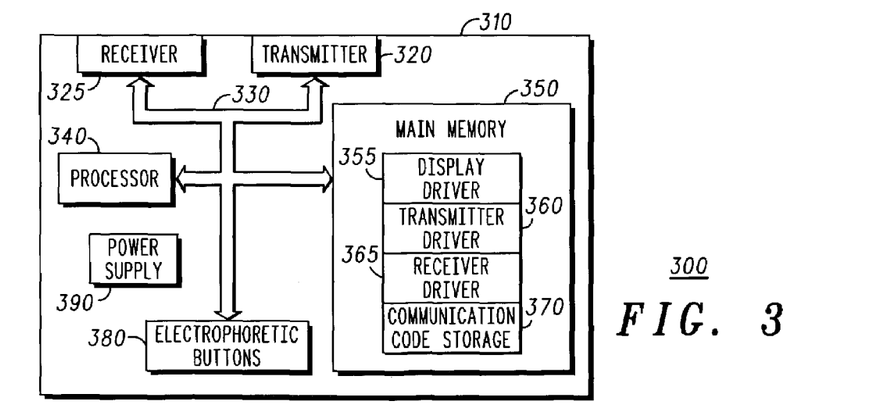
FIG. 3 illustrates the components of a programmable remote control unit according to one exemplary embodiment.

A programmable remote control unit (300) that allows a user to customize the button labels is illustrated in FIG. 3. As shown in FIG. 3, the programmable remote control unit (300) preferably includes a housing (310), containing a processor (340) communicatively connected to a signal transmitter (320), a signal receiver (325), a main memory (350), and electrophoretic buttons (380). The programmable remote control unit (300) may be any remote control unit capable of receiving input from, or providing input to, a user, a computing device, another remote control, or a home entertainment system component. The internal components of the programmable remote control unit (300) are connected through a system bus (330) or other similar communication medium including, but in no way limited to a printed circuit board. A power supply (390) is also present to provide power to the internal components of the programmable remote control unit (300).

The housing (310) of the programmable remote control unit (300) acts as a protective case to the various components included therein. The housing (310) may be constructed of plastic, metal, composite, or any combination thereof or other suitable material, and may be formed by any number of manufacturing processes including, but in no way limited to, injection molding, blow molding, casting, or stamping.

The processor (340) illustrated in FIG. 3 executes program instructions that may be both stored and accessed in the main memory (350). The processor (340) may be constructed from one or more microprocessors and/or integrated circuits, and may include multiple instruction pipelines that can execute instructions in parallel.

As shown in FIG. 3, the main memory (350) which is accessed by the processor (340) preferably includes a display driver (355), a transmitter driver (360), a receiver driver (365), and a communication code storage (370). While each individual component of the main memory (355-370) is shown to reside in the main memory (350) in FIG. 3, it is certainly possible that the individual components of the main memory are not all contained in the main memory (350) or that the components are not all present in the main memory (350) at the same time. The term "memory" is used herein to generically refer to the entire actual and virtual memory of the programmable remote control unit (300). Any or all of the components (355-370) could be stored in an auxiliary memory, implemented as an application specific integrated circuit (ASIC) or otherwise programmed or wired into the unit (300).

The display driver (355) located in the main memory (350) is a program that interacts with the processor (340) enabling the processor to control the display characteristics of the electrophoretic buttons (380) as described below. The display driver (355) may contain instructions for converting data representing a desired button label to a pixel representation. The display driver (355) may then produce the pixel representation as actual graphics or text on the electrophoretic buttons (380).

The transmitter driver (360) illustrated in FIG. 3 is a set of instructions stored in the main memory (350) that, when accessed by the processor (340) allows the processor to interact with and control the signal transmitter (320). The instructions contained in the transmitter driver (360) may also provide the interface between the processor (340) and the signal transmitter (320). Similarly, the receiver driver (360) illustrated in FIG. 3 is a set of instructions stored in the main memory (350) that, when accessed by the processor (340) allow the processor to interact and control the signal receiver (325). These drivers (355, 360) convert any received or transmitted information into a useable signal.

The communication code storage (370) illustrated in FIG. 3 may be a list of pre-programmed or received signal codes and function commands that may be used to control home entertainment components. When the processor (340) accesses the communication code storage (370) and identifies the communication codes corresponding to a home entertainment component the processor (340) desires to control, the processor is able to convert the communication codes to function commands transmitted from the programmable remote (300) through the signal transmitter (320) to the desired component.

Alternatively, the remote control unit (300) may be able to receive communication codes through the receiver (235) that are broadcast by another remote control unit, e.g., a remote control unit specific to a home entertainment system component. In this way, the remote control unit (300) can "learn" communication codes for systems that are not pre-programmed into the communication code storage (370). Such learned codes can be added to the communication code storage (370).

The signal transmitter (320) illustrated in FIG. 3 may be a LED, a laser diode, a radio frequency transmitter, any combination thereof, or any other means of communicating function commands from a remote control device to a selected home entertainment system component. The signal transmitter (320) illustrated in FIG. 3 is preferably a light emitting diode (LED) since a large number of entertainment system components on the market today are able to receive and be controlled by a remote utilizing an LED signal transmitter. Moreover, LED transmitters consume relatively small amounts of energy when compared to many other transmission means, which increases potential battery life. Likewise, the signal receiver (325) illustrated in FIG. 3 may be any device capable of receiving information including, but in no way limited to an antenna, a radio receiver, an LED signal receiver, a physical connection such as a cable, or any combination thereof.

The power supply (390) illustrated in FIG. 3 provides power to all of the components of the illustrated embodiment of the present programmable remote control unit (300). The power supply (390) may be any number of power storage devices including, but in no way limited to removable batteries, thin film batteries, or internal rechargeable batteries.

The electrophoretic buttons (380) illustrated in FIG. 3 may be any number of control buttons located on the body of the programmable remote control unit (300) that may be accessed by a user in order to control the functions of home entertainment components. An electrophoretic button is meant to be understood both here and in the appended claims as any button that includes charged electrical species suspended in a suspension medium that migrate when an electric field is applied. The electrophoretic buttons (380) of the programmable remote, when pressed, send a specific signal to the processor (340) representing a desired command to either be transmitted to, or received from home entertainment components. It is within the scope of the present programmable remote control unit to include any number of electrophoretic buttons (380) corresponding to any number of controllable functions. Preferably the programmable remote control unit initially may include, but is in no way be limited to, numbers 0-9, channel up and down, volume up and down, enter button, mute button, play, stop, fast forward, reverse, pause, record, component button, and macro buttons. All of the above-mentioned buttons, however, may be programmed and labeled as desired by the user with any user desired label or graphic icon.

Figure 4:
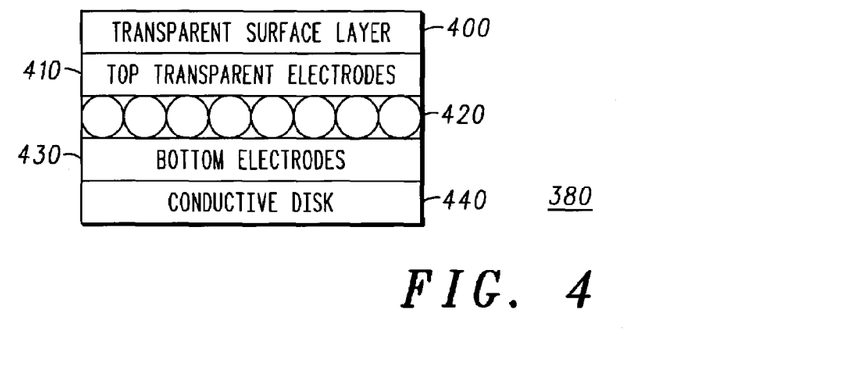
FIG. 4 illustrates the structure of an addressable button according to one exemplary embodiment.

FIG. 4 illustrates the structure of the electrophoretic buttons (380) according to one embodiment of the present programmable remote control unit. As shown in FIG. 4, an electrophoretic button (380) preferably includes a transparent surface layer (400), a top transparent layer of electrodes (410), a plastic film composed essentially of microcapsules (420), a bottom layer of electrodes (430), and a conductive disk (440).

The transparent surface layer (400) illustrated in FIG. 4 forms the top layer of the electrophoretic button (380). The transparent surface layer (400) allows the user to view any symbols or labels that may be formed by the electrophoretic button (380) while providing a protective layer to the other electrophoretic components (410-440). The transparent surface layer (400) maybe composed of any material capable of providing a transparent protective layer to the electrophoretic button (380). The transparent surface layer (380) is preferably made of a transparent polymer in order to provide the tactile feel of traditional remote control buttons thereby improving button access in low light conditions.

Directly below the transparent surface layer (400) is a top transparent layer of electrodes (410). As illustrated in FIG. 4, the top transparent layer of electrodes (410) comprises circuitry that forms a pattern of electrode pixels that may be selectively controlled by the display driver (355, FIG. 3) to form a pattern of electric fields thereby forming a desired character or label on an electrophoretic button (380).

The bottom layer of electrodes (430) of the electrophoretic button (380) illustrated in FIG. 4 also comprises circuitry that forms a pattern of electrode pixels that may be controlled by the display driver (355, FIG. 3). The bottom layer of electrodes (430) however, may be composed of any conductive coating capable of being controlled in a pixel pattern, regardless of its transparency. The bottom layer of electrodes (430) may be opaque because it is positioned below the plastic film layer composed essentially of microcapsules (420) and will not obstruct a user's view of any character or label formed by the electrophoretic button (380).

Both the bottom layer of electrodes (430) and the top layer of electrodes (410) may be Indium Tin Oxide (ITO) or some other suitable conductive material. The Conductive layers of the electrodes (430, 410) may be applied from a vaporous phase, by electrolytic reaction, or deposition from a dispersed state such as spray droplets or dispersions in liquids. Moreover, the two electrode layers (430, 410) do not need to include the same conductive material. According to one embodiment of the electrophoretic button (380), the top layer of electrodes (410) is a transparent conductive coating such as ITO or a transparent polyaniline. The bottom layer of electrodes (430) may be an opaque conductive coating such as a patterned graphite layer. Alternatively, the bottom layer of electrodes (430) may be polymeric. The polymer may be intrinsically conductive or can be a polymer carrier with a metal conductor such as silver doped polyester or a silver-doped vinyl resin. Conductive polymers suitable for use as the bottom layer of electrodes (430) include, but are in no way limited to polyaniline, polypyrrole, polythiophene, polyphenylenevinylene, and their derivatives. These organic materials may be colloidally dispersed or dissolved in a suitable solvent before coating.

Alternatively, the top and bottom electrode layers (410, 430), as well as the plastic film composed essentially of microcapsules (420) may be formed by a printing method. According to one embodiment, the bottom layer of electrodes (430) is printed on the conductive disk (440) illustrated in FIG. 4. Once the bottom layer of electrodes has been printed on the conductive disk (440), E INK or another plastic film composed essentially of microcapsules (420) is printed on the bottom layer of electrodes (430). A top layer of transparent electrodes (410) may then be printed on the plastic film composed essentially of microcapsules (420) followed by the formation of a transparent surface layer (400). The top and bottom layers of electrodes (410, 430) are printed in such a manner that they are in electrical communication with the plastic film composed essentially of microcapsules (420). By forming the electrophoretic button (380) using a printing method, production costs may be reduced and conductor thickness can be readily controlled.

The top and bottom electrodes (410, 430) may be addressed and controlled by any method capable of controlling multiple pixels. According to one embodiment, a plurality of row and column drivers (not shown) may be interfaced to each electrophoretic button (380). The processor (340, FIG. 3) may then use the row and column drivers to individually control each pixel formed by the top and bottom electrodes (410, 430).

Alternatively, each pixel on each electrophoretic button (380) may have a direct connect structure, namely, each pixel may have its own lead line from a control chip (not shown) that is communicatively connected to the processor (340, FIG. 3) through the bus (330, FIG. 3). According to this embodiment, each lead line may be a discrete or packaged transistor line that is connected to the grid of electrodes (410, 430) through a via to the output of the control chip (not shown). According to this embodiment, for an N×N grid, $N^2+1$ control lines are needed. The additional line is used to connect to a continuous top electrode.

According to another embodiment of the present programmable remote control unit (300), the top and bottom layers of electrodes (410, 430) may be controlled by forming a matrix display using an array of varistors, metal-insulator-metal or discrete diodes (not shown) for individually addressing each pixel. For example, discrete, surface mount zener diodes may be used to form two terminal devices. Each terminal device will be located on adjacent edges of the matrix display. According to this embodiment, only 2*N+1 control lines will be needed to control an N×N button grid.

The conductive disk (440) located below the bottom electrode (430) illustrated in FIG. 4 acts as a contact bridge in one embodiment of the present programmable remote control unit (300). When the electrophoretic button (380) is pressed, the disk touches two or more contacts on a printed circuit board or other source and acts as a contact bridge between the contacts completing a circuit. When the conductive disk (440) performs a contact closure, a signal is allowed to continue on to the processor (340, FIG. 3). The processor (340, FIG. 3) is then able to sense the contact closure and perform the function allocated to that designated closure. The conductive disk is formed below the bottom electrode (430) and may be made of any conductive material capable of acting as a contact bridge. The conductive disk (440) may be attached to the bottom electrode using any number of adhesives or other mechanical joining devices.

Located between the top and the bottom electrodes (410, 430) is a plastic film composed essentially of microcapsules (420) as illustrated in FIG. 4. According to one embodiment, the plastic film layer composed essentially of microcapsules (420) preferably contains capsules that may have an average diameter on the order of about 100 microns. Capsules this small allow for significant bending of the electrophoretic buttons (380) without permanent deformation or rupture of the capsules themselves. Any curvature by the capsules themselves will essentially be optically undetectable.

The individual layers of the electrophoretic buttons (380) are preferably bonded to each other with an electrically conductive adhesive. Use of an electrically conductive adhesive will allow the layers to be structurally bonded while still providing electrical communication between the electrode layers (410, 430) and the plastic film layer composed essentially of microcapsules (420). The transparent disk (440) and the transparent surface layer (400) may be bonded to the transparent electrode layers (410, 430) using any appropriately strong adhesive, regardless of whether or not the adhesive is electrically conductive.

The electrophoretic buttons of the present programmable remote control unit may also include additional components and/or characteristics. These added characteristics include, but are in no way limited to, back lighting for increased functionality in low light conditions, colored buttons, or function suggestive shapes.

Figure 5:
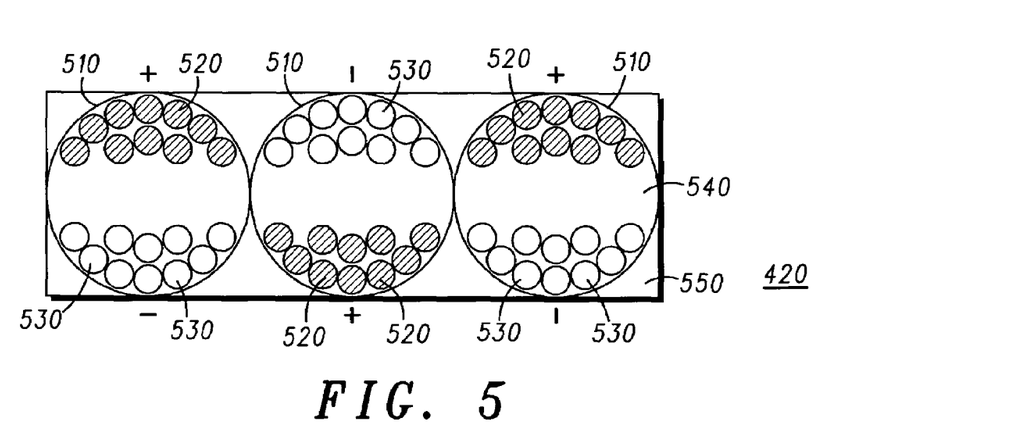
FIG. 5 illustrates the structure of an addressable electrophoretic layer according to one exemplary embodiment.

FIG. 5 further illustrates the structural components of one embodiment of the plastic film layer composed essentially of microcapsules (420). As illustrated in FIG. 5, the plastic film layer composed essentially of microcapsules (420) is an optoelectonically active material that comprises at least two phases: an electrophoretic contrast media phase and a coating/binding phase.

According to one embodiment, the electrophoretic contrast media phase includes a number of microcapsules (510) containing both positively charged white pigment chips (530) and negatively charged black pigment chips (520) suspended in a clear suspension medium (540). While the charged pigment chips (520, 530) have been described as being black and white respectively, it is within the scope of the present plastic film layer that the pigment chips be any color or have any other physical and electrical characteristic. However, by programming the electrophoretic buttons using charged black and white pigment chips, the labels formed on the buttons are easily seen in low light conditions.

With the microcapsules (510) containing pigment chips of opposing charges (520, 530), an electric field may be applied to the microcapsules (510) to form a desired image. When a negative electric field is applied to the top of a microcapsule, the positively charged white pigment chips (530) are attracted to the electric field and migrate to the top of the microcapsule (510) where they are visible to the user. This positioning of the white pigment chips (530) causes the surface of the microcapsule (510) to appear white. A positive electric field may also be applied to the lower portion of the microcapsule (510). The positive electric field attracts the negatively charged black pigment chips (520). By attracting the black pigment chips to the bottom of the microcapsules (510), they become hidden to the view of the user as illustrated in FIG. 5. By selectively varying the electric fields on the respective surfaces of the microcapsules (510), a processor (390, FIG. 3) is capable of forming any character or label possible given the pixel size. In the described embodiment, a pixel may correspond to a single microcapsule or a group of microcapsules may be coordinated to form a larger pixel size.

According to one embodiment, the coating/binding phase (550) includes a polymer matrix that surrounds the microcapsules (510). According to this embodiment, the polymer in the polymeric binder is capable of being dried, cosslinked, or otherwise cured as in traditional inks. This property allows a printing process to be used to deposit the plastic film layer.

While the plastic film layer composed essentially of microcapsules (420) has been described as microcapsules containing charged pigment chips, the present electrophoretic buttons (380, FIG. 3) may be formed using any type of microencapsulated electronically addressable contrast media including, but in no way limited to, positively charged particles of one color and negatively charged particles of another color, charged particles containing a dye precursor or dye indicator, or phosphor particles and photoconductive semiconductor particles mixed in dye indicator particles.

Exemplary Implementation and Operation

Figures 6, 7:
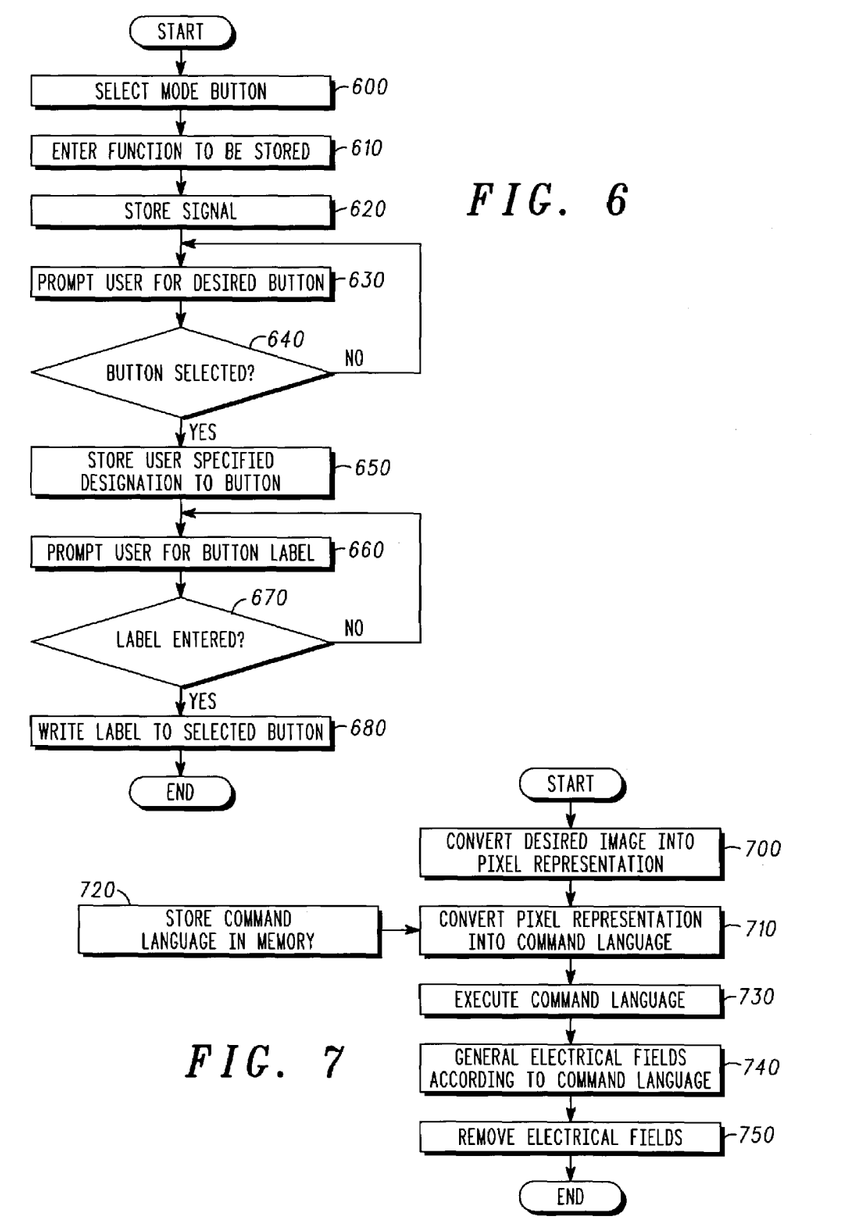
FIG. 6 is a flow chart illustrating a function command storage process according to one exemplary embodiment of the present programmable remote control unit.
FIG. 7 is a flow chart illustrating a button labeling process according to one exemplary embodiment.

When a user desires to program and label a button on the programmable remote control unit, a number of steps take place as illustrated in FIG. 6. When the program mode is initiated, the user first selects a mode button (step 600) to which the desired function command will be assigned. According to one embodiment, the present programmable remote control unit is capable of controlling multiple home entertainment components. In order to reduce the number of electrophoretic buttons required on the programmable remote control unit, a number of mode keys may be present representing the different components that may be controlled with the programmable remote control unit. When one of the mode keys is selected, all of the electrophoretic buttons are adjusted to the settings that correspond to the selected component. When the mode button is selected by the user during a programmable sequence (step 600), the controller knows which component the subsequently received function commands should be assigned to. Once the mode button has been established, the programmable remote is ready to receive a desired function to be programmed (step 610). The desired function may be received by the programmable remote control unit according to a number of methods known in the art. According to one embodiment, the user executes the desired function on the component-specific remote control unit and the function commands are received in the programmable remote control unit through the receiver (325, FIG. 3).

Once the function commands are received by the programmable remote control unit, the function commands are stored (step 620) in the communication code storage portion of the main memory (370, FIG. 3). With the desired function and commands stored, the programmable remote control unit prompts the user to select the electrophoretic button the user would like to assign the received function command (step 630). Communication between the user and the programmable remote control unit may be performed in a number of different ways including, but in no way limited to, a liquid crystal display (LCD) located on the programmable remote, an externally connected computer screen, or through prompts displayed on a television. The prompts are preferably displayed on a television in order to reduce production cost of the programmable remote and to increase convenience. When the user is prompted to select the desired button, the programmable remote control unit will wait until a button is pressed (step 640). If no button is selected within a designated period of time, the user will be prompted again. When the user has selected the assigning button (YES, step 640), the received function is stored and associated with the selected button in the communication code storage (step 650). By associating the button with the received function command, the processor (340, FIG. 3) of the programmable remote control unit is able to access the received function command when the assigned button is pressed on the remote when functioning in the selected mode.

Once the user has selected and stored the indicated button selection, the user is prompted to enter a button label (step 660). According to one embodiment, the user is allowed to select both numbers and letters from a television display. The selection of the numbers and the letters that will be used on the button label may be performed through a navigation and selection process facilitated by the programmable remote control unit. The programmable remote control unit will wait for the label to be completed (step 670), which completion may be signaled by the selection of an end identifier of the navigation and selection process. In other embodiments, graphic or iconic labels for programmed buttons (380, FIG. 3) can be stored in the main memory (350, FIG. 3) or transmitted into the unit (300) through the receiver (325) or some other external connection. This graphic or iconic labels can be selected for use in labeling a programmed button in the same manner described above for selecting letters and numbers. Once the desired label has been entered, the label is written on the selected button (step 680).

The step of writing the desired label onto the selected button is further described in FIG. 7. When the desired label is entered or selected by the user (step 670, FIG. 6), the label content is converted into a pixel representation (step 700) by the display driver (355, FIG. 3). The pixel representation is subsequently converted by the display driver into a command language (step 710) that allows the processor (340, FIG. 3) to communicate and control the top and bottom layers of electrodes (410, 430, FIG. 4) on the selected electrophoretic button (380, FIG. 3). The processor (340, FIG. 3) then executes the command language (step 730) and by communicating with the selected electrophoretic button, generates the necessary electrical fields in the electrophoretic button to form the desired label or image. Where the desired label or image is meant to appear black to the viewer, the command language causes the top transparent electrodes (410, FIG. 4) to produce a positive electric field. The positive electric field attracts the negatively charged black pigment chips (520, FIG. 5) in the microcapsules (510, FIG. 5) to the top of the microcapsules where the user may view them. Where the desired label or image is meant to appear white to the viewer, the command language causes the top transparent electrodes (410, FIG. 4) to produce a negative electric field that will attract the positively charged white pigment chips (520, FIG. 5). The command language may also cause the bottom electrodes to produce the opposite electric field as the field that is produced by the top transparent electrodes (410, FIG. 4).

Once the desired electric fields have been produced and the desired label or image has been formed on the desired electrophoretic button, the electric fields are removed (step 750). According to one embodiment of the present programmable remote control unit, the electrophoretic buttons are bi-stable, so that once the desired label or image has been formed on the electrophoretic button and the electric field has been removed, the label or image remains in its last state. By being bi-stable, power draw is eliminated between button label changes. As a consequence, the programmable remote control unit has a battery life approximately equal to that of a typical component remote control unit.

Additionally, once the pixel representation of the desired label or image has been converted into command language (step 710), the command language is stored in the main memory (step 720) and associated with the selected button. By storing the command language in the main memory, the processor is able to access the stored command language and change the labels on the electrophoretic buttons accordingly whenever the mode key corresponding to the selected component is selected. The programmed function commands are also assigned to the remote buttons when the mode key is selected. This enables the programmable remote to be fully functional with a selected component with a single selection of the mode key.

Figure 8:
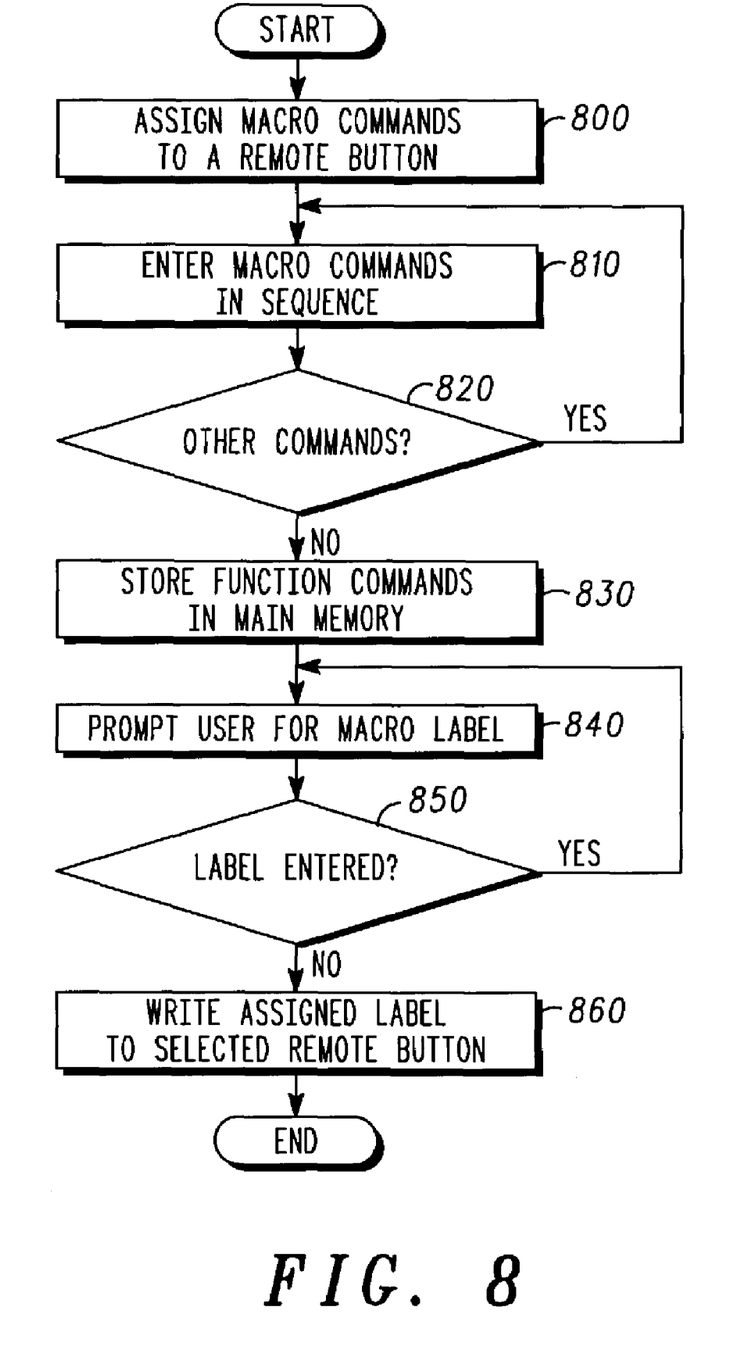
FIG. 8 is a flow chart illustrating a macro storage process according to one exemplary embodiment.

The present programmable remote control unit may also control multiple functions on multiple components through the execution of a macro. A macro is a saved sequence of commands that can be stored and then recalled with a single button stroke. FIG. 8 illustrates how the programmable remote control unit is able to both store and perform macros according to one embodiment of the present programmable remote control unit. As illustrated in FIG. 8, a user begins programming a macro into the present programmable remote control unit by first selecting the electrophoretic button that will execute the macro (step 800). Once the electrophoretic button is identified, the user may sequentially enter the macro commands (step 810). The macro function commands are preferably received by the programmable remote control unit from individual component remotes as explained above or by selecting commands from the code communication storage (370, FIG. 3).

After each macro function command is entered into the programmable remote control unit, the programmable remote control unit prompts the user for other function commands (step 820). If there are additional function commands, the programmable remote waits to receive them from the user. However, if the user indicates that there are no additional commands for the selected macro, the programmable remote control unit stores the sequential function commands in the main memory (step 830) and prompts the user for a macro label (step 840). The programmable remote waits for the user to enter a macro label (step 850) and then writes the received label to the selected macro electrophoretic button (step 860) according to the process explained above.

When the user presses an electrophoretic button that has been assigned to perform a macro, the processor (340, FIG. 3) accesses the sequentially stored function commands that have been stored in the main memory (350, FIG. 3). The sequentially stored function commands are then sequentially executed by the processor and transmitted to the various components through the transmitter (320, FIG. 3) thereby executing the macro.

Alternative Embodiments

Figure 9:
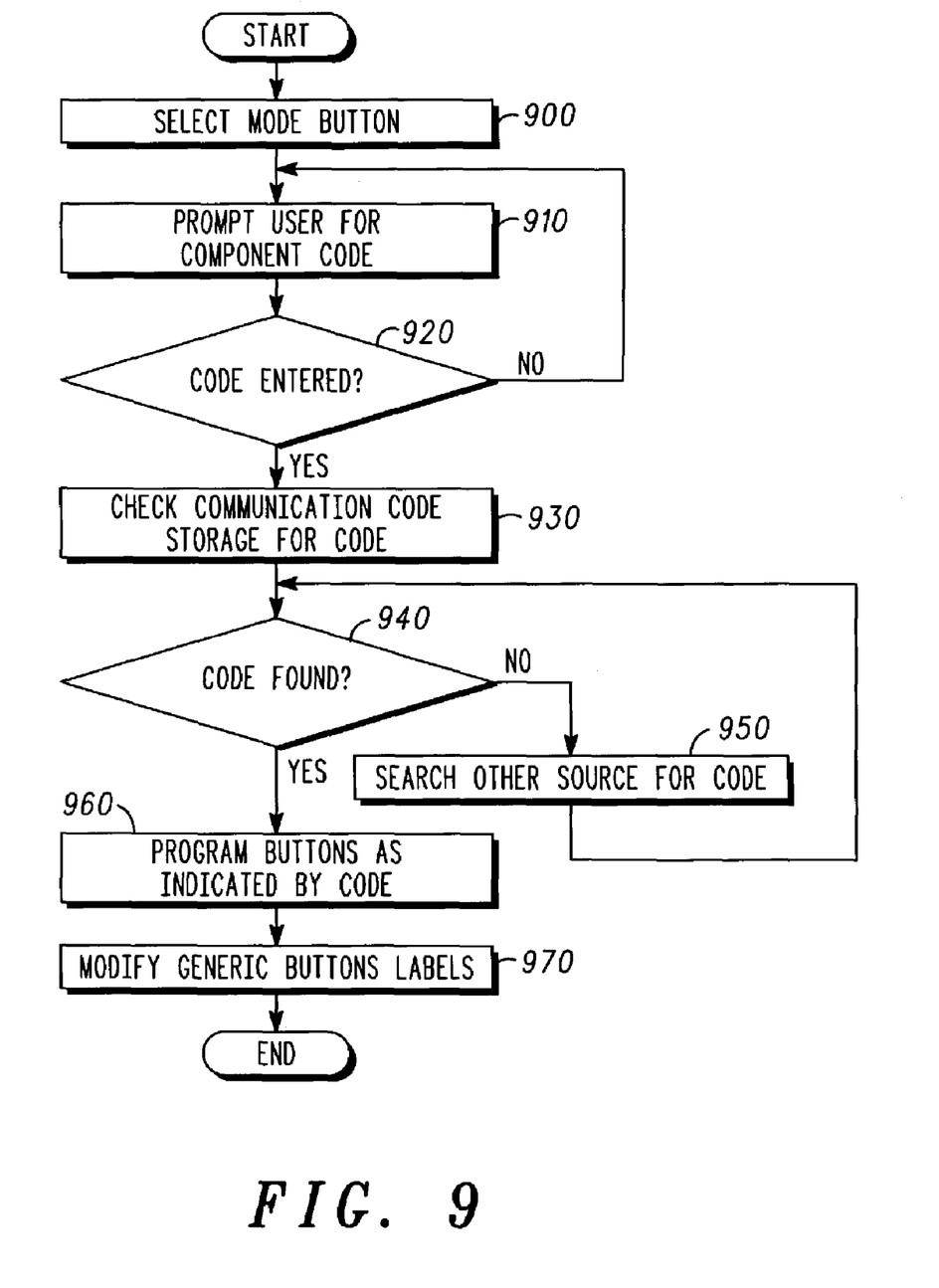
FIG. 9 is a flow chart illustrating a self-programmable storage operation according to an alternative embodiment.

In an alternative embodiment of the present programmable remote control unit illustrated in FIG. 9, the programmable remote control unit may contain pre-programmed communication codes that may be accessed to automatically configure and label the electrophoretic buttons. According to this embodiment, when the user initiates a program sequence by selecting the mode button to be programmed (step 900), the programmable remote control unit prompts the user for a component code (step 910). The user may be prompted by the programmable remote control unit according to any of the previously mentioned methods, but is preferably prompted through display on a television. According to this embodiment, the user will have access, through the Internet or in an instruction manual, to a number of component codes that identify a large number of home entertainment components. Once prompted, the programmable remote will wait for the requested code for a specified amount of time (step 920) after which, if the code has not been entered, the programmable remote will prompt the user for the component code again.

Once the component code corresponding to the home entertainment component the user desires to control has been entered (YES, step 920), the programmable remote searches the communication code storage (370, FIG. 3) portion of the main memory (350, FIG. 3) for the entered component code. Included with the component codes in the main memory are a number of function commands accepted by the indicated components and proposed generic button labels to be applied to potentially programmable buttons. If after searching for the entered component code (step 930) the code is not found in the communication code storage (NO, step 940), the programmable remote may search additional sources for the entered component code and its function commands (step 950). The sources that may be searched by the programmable remote control unit include, but are in no way limited to, a removable memory card, component remote control units, or the Internet. Once the entered component code has been found (YES, step 840), the function commands and the proposed generic button labels are applied to the electrophoretic buttons (step 960) as explained above. When the proposed generic button labels have been applied to the electrophoretic buttons (step 960), the user is presented with the opportunity to customize the labels that have been applied (step 970). The user may alter any of the generic labels as indicated previously.

Figure 10:
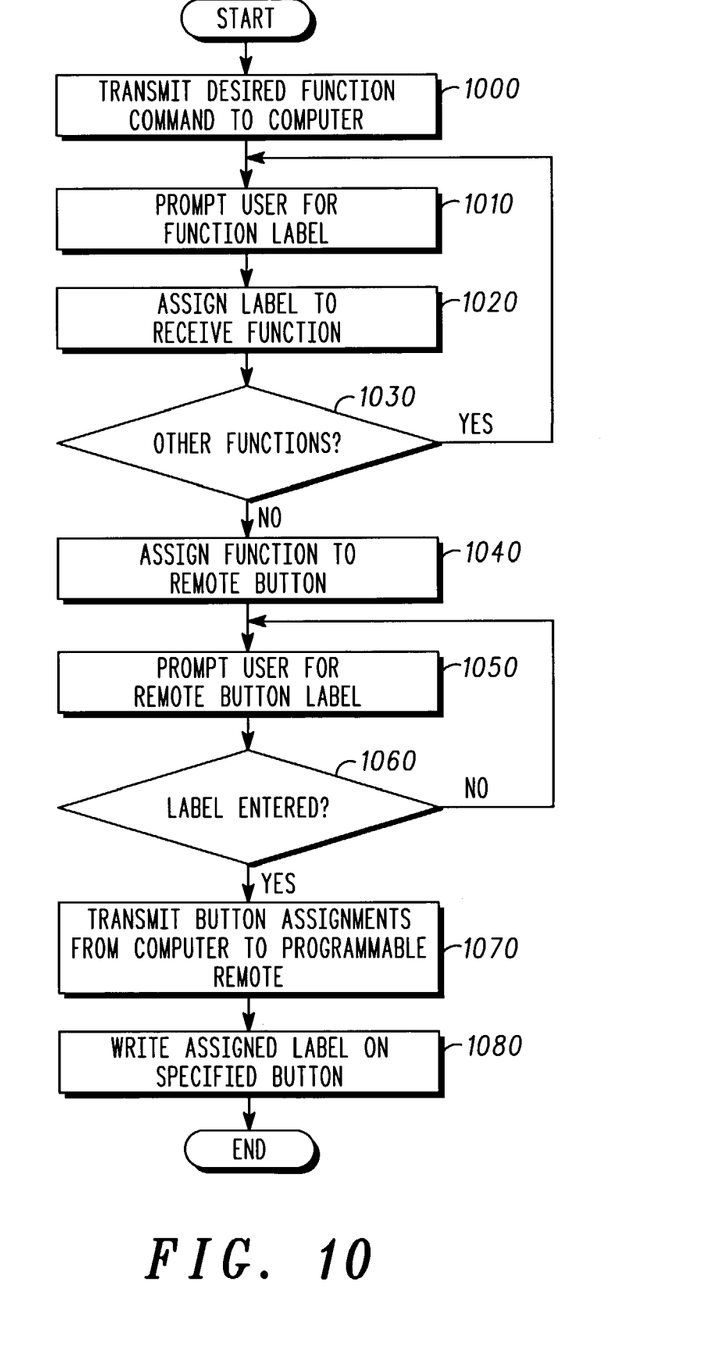
FIG. 10 is a flow chart illustrating a function command storage process using a computer according to an alternative embodiment.

In yet another embodiment of the present programmable remote control unit illustrated in FIG. 10, the function commands, the macro commands, and the labels applied to the electrophoretic buttons may be applied with the use of a computer. As illustrated in FIG. 10, a computer with appropriate hardware and software may receive a function command from a component remote (step 1000) that a user desires to be programmed into the programmable remote. When the function command is received by the computer, the computer will prompt the user for a function label (step 1010) that describes the function command received. This function label will then be applied to the received function command in the computer memory (step 1020). The computer will then prompt the user for any other function commands the user desires to program to the programmable remote (step 1030).

Once all of the desired function commands have been entered and labeled by the computer (NO, step 1030), the user may assign the received function commands to specified electrophoretic buttons on the programmable remote (step 1040). This assignment will be facilitated by a graphical representation of the programmable remote that is displayed by computer program facilitating the programming. When the control functions have been assigned to the electrophoretic buttons of the programmable remote control unit, the user may then enter a desired remote button label for each button selected (step 1050). Working on a computer, likely with a connection to the Internet, the user will have tremendous flexibility to find or design graphic or iconic labels for the electrophoretic buttons on the programmable remote.

Once all of the desired labels have been entered by the user (YES, step 1060), the programmable remote control unit may be communicatively linked to the computer and the button assignments and associated function controls are transmitted from the computer to the communication code storage (370, FIG. 3) of the main memory (step 1070). The button labels and associated function commands may be transmitted to the programmable remote control unit in any number of ways including, but in no way limited to, radio frequency, universal serial bus (USB), parallel port, firewire, etc. The received button labels and associated function commands are then produced on and associated with the electrophoretic buttons as described above (step 1080).

The preceding method for using programmable electrophoretic buttons has been described in connection with use on a programmable remote control unit. However, incorporating the same method on other electronic devices is also within the scope of the present method. Programmable electrophoretic buttons may be substituted for the external buttons on other devices including but in no way limited to VCRs, DVD players, CD players, cell phones, etc. By incorporating programmable electrophoretic buttons into the above-mentioned devices, a universal chassis could be formed for each product and the buttons could be programmed at a later time to correspond to the functions available for the model being produced.

In conclusion, the methods and systems described herein allow for the selective programming of function buttons in a programmable remote control unit or other electronic device. Specifically, electrophoretic buttons are used to display user defined characters or labels which correspond to programmed function commands used to control components. By incorporating electrophoretic buttons in a programmable remote control unit or other electronic device, programmability, readability, and power efficiency are enhanced as compared to conventional systems.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A programmable remote control unit comprising:
    a data processing device;
    a memory storage unit;
    a data transmitter;
    an electrophoretic button; and
    a bus that communicatively couples said data processing device to said memory storage unit, said data transmitter, and said electrophoretic button;
    wherein the optical qualities of said electrophoretic button may be modified in response to commands from said data processing device and wherein the electrophoretic button comprises:
        a transparent surface layer;

a first electrode layer coupled to said transparent surface layer;
a layer of microcapsules communicatively coupled to said first electrode layer wherein the layer of microcapsules comprise microcapsules containing a suspension medium and multiple pigment chips of opposing charges suspended in said suspension medium;
a second electrode layer communicatively coupled to said addressable layer of microcapsules; and
a conductive disk coupled to said second electrode layer;
wherein said first electrode layer and said second electrode layer are communicatively coupled to said data processing device.

2. The programmable remote control unit of claim 1, wherein said commands which modify the optical qualities of said electrophoretic button further comprise instructions that cause said electrophoretic button to display a representation of a user determined label.

3. The programmable remote control unit of claim 2, wherein said electrophoretic button may be programmed to initiate the transmission of a component function command to control a videocassette recorder, a digital videodisk player, a compact disk player, a television, or a radio.

4. The programmable remote control unit of claim 3, wherein said label corresponds to said programmed component function command.

5. The programmable remote control unit of claim 4, wherein said programmable remote control unit further comprises a signal receiving device.

6. The programmable remote control unit of claim 5, wherein said signal receiving device:
receives said component function command from a component remote; and
said component function command is stored in said memory storage unit.

7. The programmable remote control unit of claim 5, wherein:
said signal receiving device receives said component function command from a personal computer; and
said component function command is stored in said memory storage unit.

8. The programmable remote control unit of claim 5, wherein said electrophoretic button may be programmed to sequentially execute multiple component function commands.

9. The programmable remote control unit of claim 1, wherein said first electrode layer is optically transparent.

10. The programmable remote control unit of claim 1, wherein said first and second electrode layers selectively apply electric fields to said microcapsules causing said pigment chips of opposing charges to migrate in said suspension medium.

11. The programmable remote control unit of claim 10, wherein said electric field causes said pigment chips to form a representation of said user determined label.

12. The programmable remote control unit of claim 1 wherein said memory storage unit comprises:
predetermined component function commands; and
predetermined button labels associated with said predetermined component function commands.

13. The programmable remote control unit of claim 12, wherein when said predetermined component function commands are assigned to said electrophoretic buttons, said data processing device forms a representation of said predetermined button labels on said electrophoretic buttons.

14. An electrophoretic button for use with an electronic device comprising:
a first electrode layer comprised of a transparent conductive material;
a layer of microcapsules communicatively coupled to said first transparent electrode layer wherein said layer of microcapsules further comprise
microcapsules each comprising
a suspension medium;
a first plurality of pigment chips having a first color and a first charge suspended in said suspension medium; and
a second plurality of pigment chips having a second, different color and a second charge opposite to the first charge suspended in said suspension medium; and
a second electrode layer communicatively coupled to said layer of microcapsules;
wherein said first electrode layer and said second electrode layer selectively apply an electric field to said layer of microcapsules.

15. The electrophoretic button of claim 14, wherein said first and second electrode layers selectively apply an electric field to said layer of microcapsules causing said pigment chips of opposing charges to migrate in said suspension medium.

16. The programmable remote control unit of claim 15, wherein said electric field causes said pigment chips of opposing charges to migrate in such a way as to form a user defined label.

17. An apparatus comprising:
a memory storage unit;
a data transmitter;
an electrophoretic button; and
a data processing device communicatively coupled to said memory storage unit, said data transmitter, and said electrophoretic button;
wherein optical qualities of said electrophoretic button may be modified in response to commands from said data processing device and the electrophoretic button comprises:
a first transparent electrode layer;
a layer of microcapsules communicatively coupled to said first transparent electrode layer wherein each microcapsule is filled with a suspension medium and multiple pigment chips of opposing charges suspended in said suspension medium; and
a second electrode layer communicatively coupled to said layer of microcapsules;
wherein said first electrode layer and said second electrode layer selectively apply electric fields to said layer of microcapsules.

18. The apparatus of claim 17, wherein said electrophoretic buttons can be programmed to execute function commands.

19. The apparatus of claim 18 further comprising a data receiver communicatively coupled to said memory storage unit wherein said function commands are received by said data receiver and stored in said memory storage unit.

20. The apparatus of claim 17, wherein said first and second electrode layers selectively apply electric fields to said layer of microcapsules causing said pigment chips of opposing charges to migrate in said suspension medium.

21. The apparatus of claim 20, wherein said first and second electrode layers are selectively addressable by said data processing device.

* * * * *